Feb. 9, 1926. 1,571,960
J. C. NEEDHAM
ELECTRICAL MEANS FOR INDICATING AT A DISTANCE THE MOTION OF AN APPARATUS
Filed Nov. 17, 1920 2 Sheets-Sheet 1
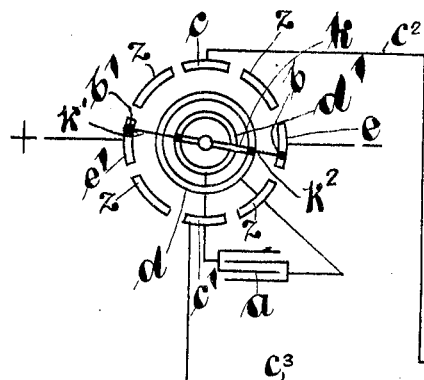
Fig. 1.
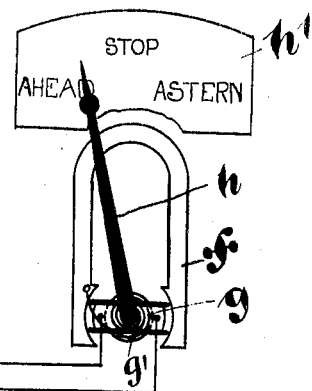
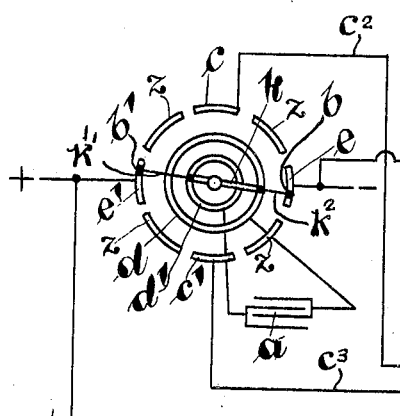
Fig. 2.
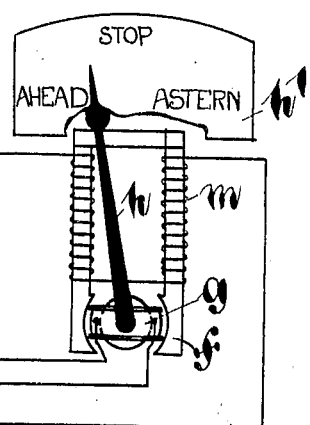
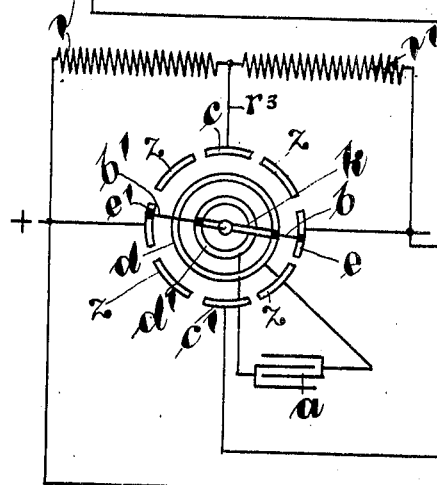
Fig. 3.
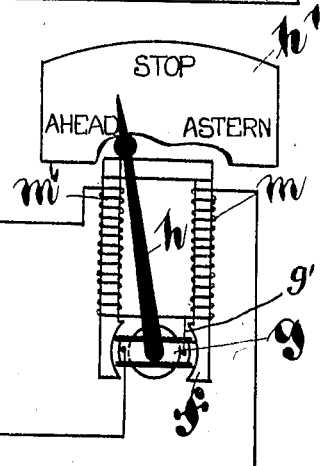
INVENTOR:
John C. Needham
By Wm Wallace White
ATTY.

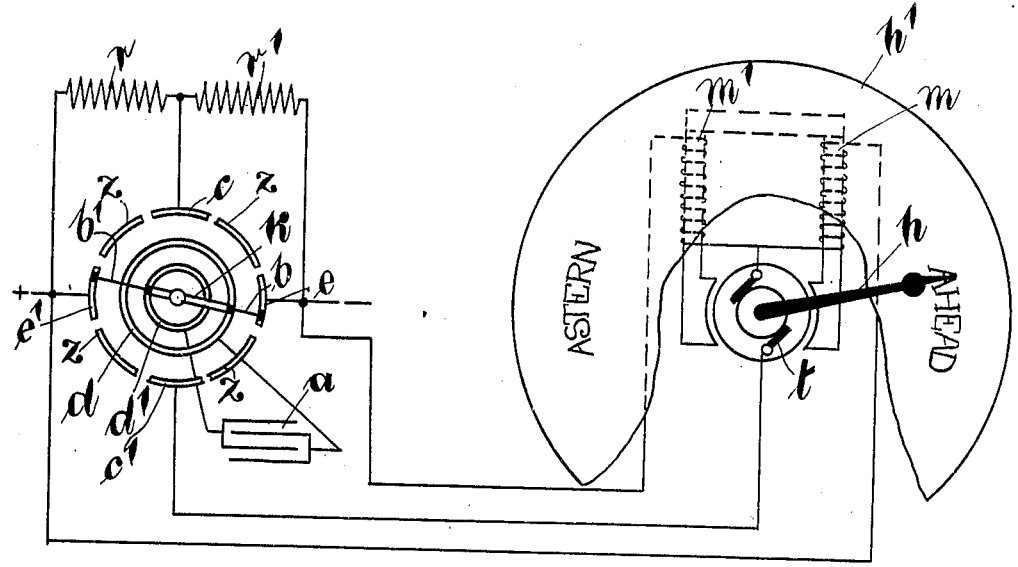
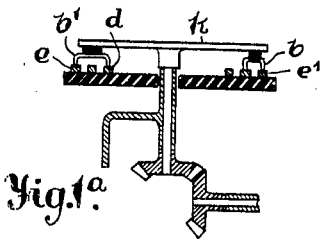

Patented Feb. 9, 1926.

1,571,960

UNITED STATES PATENT OFFICE.

JOHN CUTHBERT NEEDHAM, OF CHISWICK, LONDON, ENGLAND, ASSIGNOR TO HIMSELF AND EVERSHED & VIGNOLES, LIMITED, OF CHISWICK, LONDON, ENGLAND, A COMPANY OF GREAT BRITAIN AND IRELAND.

ELECTRICAL MEANS FOR INDICATING AT A DISTANCE THE MOTION OF AN APPARATUS.

Application filed November 17, 1920. Serial No. 424,576.

*To all whom it may concern:*

Be it known that JOHN CUTHBERT NEEDHAM, subject of the King of Great Britain and Ireland, residing at Acton Lane Works, Chiswick, London, W.-4, England, has invented new and useful Improved Electrical Means for Indicating at a Distance the Motion of an Apparatus, of which the following is a specification.

This invention has for its object the construction of electrical apparatus for indicating at a distance whether a mechanism is in motion, and if so, in which of two directions.

A commutator is arranged so that when it is rotated it makes a succession of contacts, alternately charging a condenser from a source of continuous electric current and discharging it through a current-indicating device, the succession of contacts being so arranged that when the moving part of said commutator is rotated in one direction the discharge from the condenser flows through the indicating device in a specified direction and when the direction of rotation is reversed the direction of flow of the discharge current through the indicating device is reversed. The indicating device is polarized so that it deflects to one side or the other, or rotates in one or the other direction, according to the direction in which the condenser discharges through it, and therefore according to the direction of rotation of the commutator; while it remains at a central zero (or if a rotating device, remains motionless) if the motion of the commutator stops. The amount of deflection (or the speed of rotation if the current indicating device is of a rotatory character) depends upon the capacity of the condenser, the charging pressure and the speed; all these can be adjusted so that full scale deflection is obtained (or a rotation at a reasonable speed produced in the indicator) for quite slow motions of the mechanism with regard to which information is required.

If the polarized current indicating device is of the type using permanent magnets, reversal of the supply voltage will reverse the indications of the instrument. To overcome this objection electro-magnets energized from the same source of supply as that used to charge the condenser may be used. The energizing of the magnet of the current indicating device necessitates the running of two extra conductors to the receiving position, but by the provision at the transmitter and receiver of a contact at a potential intermediate and preferably about mid-way between that of the positive and negative terminals of the supply I am able, in the case of apparatus employing the discharge current to eliminate one of the connections between the transmitter and the actuating coil of the current indicator.

Referring to the drawings:—

Figs. 1, 2, 3 and 4 show typical arrangements of this apparatus employing the discharge current and Fig. 1^A is a sectional view of the commutating device employed in these arrangements. I therefor do not in any way limit myself to the arrangements illustrated, as it is obvious from the nature of the invention that the arrangements of the connections and apparatus may be varied in many ways to suit various requirements.

Fig. 1 illustrates the system in its simplest form. A condenser $a$ is connected to the slip rings $d$, $d'$; a source of electric supply is connected to contacts $e$, $e'$, and an indicating instrument to contacts $c$, $c'$, these contacts being so disposed that brushes $b$, $b'$, mounted on a brush arm $k$ rotated by that, the motion of which is to be observed, successively connect the condenser to the supply and to the instrument. Blank contacts $z$ are provided to prevent short circuiting. The indicating instrument shown is a centre-zero spring-controlled galvanometer comprising a permanent magnet $f$, a moving coil $g$, a spring $g'$, a pointer $h$, and dial $h'$ which may be marked to suit requirements. The direction of the current discharging through the indicator depends on the direction of rotation of the brush arm $k$. In the arrangement I have shown, clockwise rotation of $k$ causes the discharge current to be positive at $c$ and negative at $c'$, and obviously if the apparatus is revolved in an anti-clockwise direction $c$ will become negative and $c'$ positive. If the brush arm stops rotating, no deflection occurs on the instrument after the condenser has lost its charge. It will be noted that the contacts must be so spaced that the brushes cannot simultaneously bridge two adjacent contacts, as otherwise there is a liability of the engine stopping with the brushes bridging a charging and discharging position which would cause a permanent deflection to be shown at the indicating instrument. When the brush arm is rotating in a clock wise direction the condenser is charged from the positive of supply through the bush $b'$, brush conductor $k'$, slip ring $d$ to condenser $a$; from condenser $a$ through slip ring $d'$, brush conductor $k^2$, brush $b$ to negative of supply, and discharged through slip ring $d$, brush conductor $k'$, brush $b'$ and contact $c$ to conductor $c^2$ through coil $g$ and conductor $c^3$ to contact $c'$, and through brush conductor $k^2$ and slip ring $d'$ back to condenser $a$ from the above the charging and discharging circuits may be readily traced when the rotation of the brush arm is in a counter clock wise direction.

Fig. 2 is similar to Fig. 1 as regards the transmitting unit but the field magnet of the indicator is no longer a permanent one. It is wound with magnetizing coils $m$ and $m'$ which are energized from the same source of supply as the system. This system is preferable to that shown in Fig. 1 as a reversal of the polarity of the supply will not affect the readings of the indicator.

Fig. 3 is somewhat similar to Fig. 2 but in order to economize wiring, the conductor $c^2$ is omitted and resistances $r$, $r'$ are inserted in the transmitter and connected to the contact $c$ by a conductor $r^3$, a second resistance is also provided, said second resistance conveniently being the field magnet winding $m$, $m'$ of the indicator, which is connected to the coil $g$ thereof by a conductor $g'$ It is essential with this arrangement that the potential of the conductor $r^3$ is equal to the potential of the conductor $g'$ so as to form a convenient discharge circuit for the condenser $a$ through coil $g$.

Fig. 4 is a similar system to that shown in Fig. 3 as regards the method of connection, but in this case the indicator takes the form of a small motor $t$, the pointer $h$ being attached to the armature shaft and rotating in either direction in accordance with the direction of rotation of the transmitter.

I claim:—

1. Electrical means for indicating at a distance whether a mechanism is in motion and if so in which of two directions, comprising, in combination, a source of continuous electric current, an electrical condenser, a polarized indicator and commutating means operated by the mechanism under observation for alternately connecting said condenser with said source to charge said condenser in a direction dependent upon the direction of rotation of said commutator and connecting said condenser with said indicator so that said condenser can discharge through said indicator.

2. Electrical means for indicating at a distance whether a mechanism is in motion and if so in which of two directions, comprising, in combination, a source of continuous electric current, an electrical condenser, a polarized indicator the direction of rotation of which is dependent upon the direction of flow of electric current through its moving part, and commutating means operated by the mechanism under observation for alternately connecting said condenser with said source to charge said condenser in a direction dependent upon the direction of rotation of said commutator and connecting said condenser with said indicator so that said condenser can discharge through said indicator.

3. Electrical means for indicating at a distance whether a mechanism is in motion and if so in which of two directions, comprising, in combination, a source of continuous electric current, an electrical condenser, a polarized indicator the magnetic field of which is induced by coils directly connected to the source of supply, and commutating means operated by the mechanism under observation for alternately connecting said condenser with said source to charge said condenser in a direction dependent upon the direction of rotation of said commutator and connecting said condenser with said indicator so that said condenser can discharge through said indicator.

In testimony whereof I have signed my name to this specification.

JOHN CUTHBERT NEEDHAM.